United States Patent [19]

Dahm et al.

[11] 4,299,723
[45] Nov. 10, 1981

[54] MICROCAPSULES AND THEIR PREPARATION

[75] Inventors: Manfred Dahm, Leverkusen; Gert Jabs, Odenthal; Bernd Koglin, Bergisch-Gladbach; Hildegard Schnöring, Wuppertal; Kurt Riecke, Kempen, all of Fed. Rep. of Germany

[73] Assignee: Bayer Aktiengesellschaft, Fed. Rep. of Germany

[21] Appl. No.: 128,928

[22] Filed: Mar. 10, 1980

[30] Foreign Application Priority Data

Mar. 14, 1979 [DE] Fed. Rep. of Germany ....... 2909950

[51] Int. Cl.$^3$ .............................................. B01J 13/02
[52] U.S. Cl. .................................... 252/316; 252/364; 282/27.5; 428/307; 428/914
[58] Field of Search .......................... 252/316; 544/67

[56] References Cited

U.S. PATENT DOCUMENTS 3,432,327 3/1969 Kan et al. ............................ 282/27.5
3,677,787 7/1972 Augl et al. ...................... 252/316 X
3,748,329 7/1973 Liebsch et al. ....................... 544/67

Primary Examiner—Richard D. Lovering
Attorney, Agent, or Firm—Connolly and Hutz

[57] ABSTRACT

Microcapsules containing a color-former solution which is encapsulated in the form of a solution in an organic solvent in capsules of the polyaddition product of a diisocyanate corresponding to the following general formula:

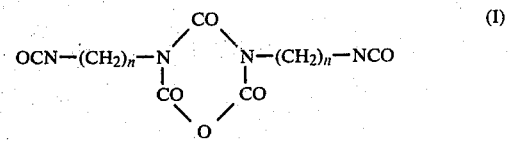

wherein
n=3–6 and a diamine wherein a mixture of an alkyl naphthalene and an isoparaffin containing from 10 to 20 carbon atoms is used as the solvent for the color-former and the microcapsules are tempered for at least 2 hours at a temperature of from 60° to 70° C. after their formation.

4 Claims, No Drawings

MICROCAPSULES AND THEIR PREPARATION

This invention relates to microcapsules for carbonless copying papers of which the colour-forming layer contains microcapsules which contain as the core material a colour-former solution and, as the shell, a polyaddition product of a diisocyanate having an oxadiazintrione structure and a diamine.

Reaction copying papers are known (cf. M. Gutcho, Capsule Technology and Microencapsulation, Noyes Data Corporation, 1972, pages 242–277; G. Baxter in Microencapsulation, Processes and Applications, published by J. E. Vandegaer, Plenum Press, New York/London, pages 127–143).

Reaction copying papers preferably consist of two or more sheets of paper placed loosely on top of one another, the upper sheet containing a transfer layer on its back side and the lower sheet containing a receiving layer on its front side. Accordingly, a transfer layer and a receiving layer are in contact with one another. The transfer layer contains microcapsules of which the core material is a solution of a dyestuff precursor in an organic solvent, whilst the receiving layer contains a material which develops the dyestuff precursor forming the dye. In the practical application of these papers, the capsules are destroyed under the high pressure of the raised type face of the typewriter and the outflowing core material impinges on the receiving layer, so that a copy is formed. The receiving layer generally contains binders and pigments, e.g., active absorbents, such as kaolin, attapulgite, montmorillonite, bentonite, acid fuller's earth or phenolic resins. For example, acid-activable dyes may be used in the transfer layer and acid-reacting components in the receiving layer.

The quality of reaction copying papers depends on the microcapsules in which the colour-former is incorporated in the form of a solution. The capsule shell has to be impermeable to the dyestuff precursor solution so that the solvent does not evaporate, otherwise the shelf life of the paper would be reduced. On the other hand, the shells are required to break easily under the pressure of the raised type face of the typewriter and, for this reason, should not too thick.

Accordingly, microcapsules for reaction copying papers have to be impermeable to the colour-former and solvent but, at the same time, sufficiently sensitive to pressure.

Phase separation processes and phase-interface polymerisation processes inter alia have been described for the production of microcapsules for reaction copying papers.

Components suitable for forming the capsule walls have also been described in large numbers, including for example the combination of certain selected diisocyanates and water, diols or diamines. In addition, German Offenlengungsschrift No. 2,311,712 describes the use of reaction products of diols or polyols having a molecular weight of from 400 to 10,000 and diisocyanates or polyisocyanates as isocyanate components for microencapsulation. It is possible in this way to encapsulate solutions of colour-formers for copying papers. These capsules are not impermeable to the generally aromatic and alkyl-aromatic solvents required for the process, although this is absolutely essential for the effect of reaction copying papers. They also have a very pronounced tendency to agglomerate. Capsule agglomerates are extremely troublesome because individual capsules are actually destroyed during the production of the papers, with the result that a patchy paper is obtained. Under adverse conditions, even the copying capacity of the papers is significantly reduced. Accordingly, individual capsules which do not tend to agglomerate are required for copying papers.

Microcapsules for the production of copying papers have to be 1. impermeable to the colour-former and its solvent. Permeability to the colour-former results in discoloration; permeability to the solvent results in drying up of the capsule filling and, hence, ineffectiveness. They are also required to break only under the pressure of the raised type face of the typewriter.
2. In other words, the capsule wall has to be capable of withstanding other kinds of loads.
3. They are required to be present in the form of individual particles rather than relatively large agglomerates.
4. They must be capable of being readily applied and immediately fixed to the surface of the paper. To this end, they are required to be so temperature-stable that they are capable of withstanding temperatures of up to 100° C. during drying.
5. Microcapsules for copying papers are particularly required to be capable of withstanding storage under humid conditions (70° C./75% relative air humidity).

The present invention is based on the discovery that microcapsules for reaction copying papers which contain colour-former solutions and which consist of the reaction product of diisocyanates corresponding to the following general formula:

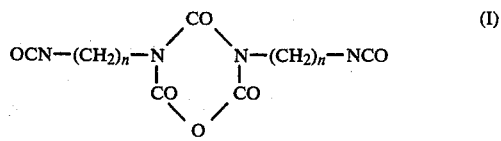

wherein n represents an integer of from 3 to 6 and a diamine are capable of withstanding storage under humide conditions (12 days at 70° C./75% relative humidity) providing a mixture of alkyl naphthalene and isoparaffin containing from 10 to 20 carbon atoms is used as the solvent for the colour-formers and providing the microcapsules are tempered for at least 2 hours at a temperature of from 60° to 70° C. after their formation.

Accordingly, the present invention relates to microcapsules which contain a solution of a colour-former, the colour-former being encapsulated in the form of a solution in an organic solvent in capsules of the polyaddition product of a diisocyanate corresponding to the following general formula:

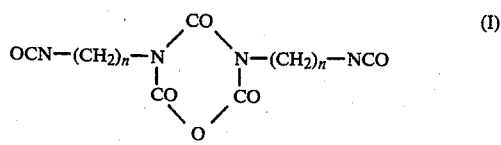

wherein n represents an integer of from 3–6 and a diamine wherein a mixture of an alkyl naphthalene and an isoparaffin containing from 10 to 20 carbon atoms is used as the solvent for the colour-former and the microcapsules are tempered for at least 2 hours at a temperature of from 60° to 70° C. after their formation.

All the parts and percentage figures referred to herein are by wt.

Suitable diamines are aliphatic primary or secondary diamines such as 1,2-ethylene diamine, bis-(3-aminopropyl)-amine, hydrazine, hydrazine-2-ethanol, bis-(2-methylaminoethyl)-methyl amine, 1,4-diaminocyclohexane, 3-amino-1-methylaminopropane, N-hydroxyethyl ethylene diamine, N-methyl-bis-(3-aminopropyl)-amine, 1,4-diamino-n-butane, 1,6-diamino-n-hexane, 1,2-ethylene diamine-N-ethane sulphonic acid (in the form of an alkali metal salt), 1-aminoethyl-1,2-ethylene diamine or bis-(N,N'-aminoethyl)-1,2-ethylene diamine. Hydrazine and its salts are also regarded as diamines in the present context. Colour-formers are essentially colourless, basic products which contain various chromophoric groups. Examples of products such as these are bis-(p-aminoaryl)-phthalides, leucoauramines, acylauramines, $\alpha,\beta$-unsaturated aryl ketones, basic monoazo dyes, rhodamine-B-lactams, such as N-(p-nitrophenyl)-rhodamine-B-lactams, polyaryl carbinols substituted by one or more amino groups and their reaction products, for example their esters or ethers, and various heterocyclic spiranes. Preferred compounds are 3,3-bis-(p-dimethylaminophenyl)-6-dimethylaminophthalide (crystal violet lactone), benzoyl leucomethylene blue and derivatives of Michler's hydrol, particularly the p-toluene sulphinate of Michler's hydrol.

Solvents which may be used in accordance with the present invention for the colour-formers and for the diisocyanates are mixtures of alkyl naphthalenes and isoparaffins containing from 10 to 20 carbon atoms. Preferred solvents are mixtures of from 70 to 90 parts by weight of alkyl naphthalenes and from 10 to 30 parts by weight of isoparaffin.

Suitable alkyl naphthalenes are, in particular, dialkylated naphthalenes, such as diisopropyl naphthalene, dibutyl naphthalene, methyl butyl naphthalene, or ethyl isobutyl naphthalene.

Suitable isoparaffins are alkanes containing from 8 to 30 carbon atoms and several side chains. Isoparaffins such as these may be obtained, for example, by oligomerising propylene and/or isobutylene. Typical representatives are isododecane, isohexadecane and isoeicosane.

The solvent used for the diamines is generally water.

To produce the microcapsules, the diisocyanate and the colour-former may first be dissolved in the solvent according to the present invention and the organic phase thus formed emulsified in an aqueous phase which may also contain one or more protective colloids. An aqueous diamine solution is then added in a stoichiometric quantity to the emulsion thus formed. The microcapsule is then tempered for at least 2 hrs at a temperature of from 60° to 70° C. To emulsify and stabilize the emulsion formed, protective colloids and emulsification aids are added to the aqueous phase. Examples of products which act as protective colloids are carboxy methyl cellulose, gelatin and polyvinyl alcohol. Examples of suitable emulsifiers are ethoxylated 3-benzyl hydroxy biphenyl, reaction products of nonyl phenol with different quantities of ethylene oxide and sorbitan fatty acid esters.

The progress of the polyaddition reaction by which the capsule wall is formed may be followed from the reaction of the isocyanate groups.

The microcapsules may be produced either continuously or in batches. Dispersion units which produce a shear gradient are generally used. Examples of suitable dispersion units are flat blade paddle agitators, cyclone impellers, high-speed stirrers, colloid mills, homogenisers, ultrasonic dispersers, nozzles, jets or Supraton machines. The diameter of the microcapsules obtained is primarily determined by the intensity of the turbulence generated during mixing. It is possible to produce capsules ranging from 1 to 2000 $\mu$m in size. Capsules ranging from 2 to 20 $\mu$m in diameter are preferred. The capsules do not agglomerate and have a narrow particle size distribution. The ratio by weight of core material to shell material is from 50-90 to 50-10. After they have been produced, the capsules are tempered for at least 2 hours at a temperature of from 60° to 70° C.

Pressure-sensitive copying papers may be produced from the capsules by a known method (cf. M. Gutcho, Capsule Technology and Microencapsulation, Noyes Data Corp, 1972, pages 242–277). The microcapsule suspensions initially obtained generally contain from 10 to 35% by weight of capsules. They have a slight tendency towards creaming providing they do not contain a binder. This effect may be used for concentration purposes. The preferred capsule size is of the order of 10 $\mu$m. The homogenised capsule suspensions provided with a binder and, optionally, inert fillers, such as talcum or kaolin, may be applied to raw paper (weighing, e.g., from 40 to 100 g/cm$^2$) either manually using a flower-wire coater or by machine, for example with an air knife, in quantities of from 4 to 8 g/m$^2$. The coating of raw papers is described in German Offenlegungsschrift Nos. 1,934,457 and 1,955,542. The papers thus coated contain the first colour-forming component and are known as transfer-layer.

In copying papers, the transfer layer is generally the back side of the upper sheet. The front side of the next sheet is coated with the second colour-forming component. This layer is known as the receiving component. In so-called copying sets, the receiving component is formed by the front side of the second sheet of paper. In multiple copying sets, the following transfer sheets have to carry a receiving coating on the opposite side. The production of receiving layers such as these is known and is also described in German Offenlegungsschrift Nos. 1,934,457 and 1,955,542.

The present invention will now be illustrated by the following examples: Production of microcapsule suspensions:

EXAMPLE 1

Production of 4 kg of a 30% microcapsule suspension 11.22 g of benzoyl leucomethylene blue (NBL) and 33.66 g of crystal violet lactone (KVL) are dissolved in 780.1 g of diisopropyl naphthalene by heating (to no more than 95° C.) and stirring, a clear solution being formed. After cooling, 195 g of $C_{10}$–$C_{12}$ isoparaffin and 180 g of oxadiazintrione diisocyanate are added to the clear solution thus formed. The organic phase is introduced into 2250 g of a 0.5% aqueous polyvinyl alcohol solution and emulsified using an ultrasonic pipe, a particle size of 11 $\mu$m being obtained. A 5.5% amine solution, consisting of 18.9 g of diethylene triamine (DET), and 9.8 g of ethylene diamine (ED) in 505.1 g of desalted water is added to this emulsion with stirring. The quantities of amine are stoichiometrically based on the isocyanate.

After the amine has been added, the product is stirred for 1 hour at room temperature, heated in 1.5 hours to 60° C. and then stirred for 2 hours at 60° C.

The ratios by weight of the mixture as a whole are as follows:

diisopropyl naphthalene: isoparaffin 80:20
KVL:NBL 3:1—3.3% KVL/1.1% NBL in the diisopropyl naphthalene/isoparaffin mixture
15% of oxadiazintrione diisocyanate in the colour-former solution
DET:ED 2:1
30% of total organic phase (diisopropyl naphthalene/paraffin/KVL/NBL/osadiazintrione)
70% of aqueous phase (water/polyvinyl alcohol/DET/ED)

EXAMPLE 2

Production of 4 kg of a 30% microcapsule suspension

The procedure is as described in Example 1, except that pure diethylene triamine is used instead of the mixture of diethylene triamine and ethylene diamine. To this end, 560 g of a 5.5% diethylene triamine solution (31.0 g of pure DET) and, correspondingly, only 2240 g of 0.5% polyvinyl alcohol solution are used.

EXAMPLE 3

Production of 4 kg of 30% microcapsule suspension 1200 g of organic phase are produced in the same way as described in Example 1, introduced into 2310 g of a 0.5% polyvinyl alcohol (degree of hydrolysis 88%) solution and emulsified for 1 minute using a siren mixer rotating at 8900 r.p.m. After this period, the emulsion contains droplets of the required size. Crosslinking is carried out using 490 g of a 5.5% ethylene diamine solution (27.0 g of ethylene diamine) in a laboratory stirrer in the same way as described in Example 1. The after treatment is also the same as described in Example 1.

EXAMPLE 4

Production of 4 kg of a 30% microcapsule suspension

The procedure is as described in Example 1, except that hydrazine hydrate is used as the crosslinker. To this end, 502.1 g of a 5.5% hydrazine hydrate solution (32.9 g of anhydrous hydrazine hydrate) and, corresponding, 2265 g of 0.5% polyvinyl alcohol solution are used.

EXAMPLE 5

Production of 4 kg of a 30% microcapsule suspension

The procedure is as described in Example 1, except that isoeicosane is used instead of the $C_{10}$–$C_{12}$ isoparaffin.

EXAMPLE 6

Production of 4 kg of a 30% microcapsule suspension

The procedure is as described in Example 1, except that, instead of the $C_{10}$–$C_{12}$ isoparaffin, isohexadecane was used as a diluent for the diisopropyl naphthalene.

EXAMPLES 7a and 7b (Comparison Examples)

45 g of crystal violet lactone are dissolved in 639.1 g of isopropyl diphenyl by heating to 95° C. and stirring, a clear solution being formed. After cooling, 344.1 g of $C_{10}$–$C_{12}$ isoparaffin and then 180 g of a liquid mixture of dimeric and trimeric hexamethylene diisocyanate are added and dissolved by stirring. The resulting organic phase is introduced into 2330 g of a 0.5% aqueous polyvinyl alcohol solution, thoroughly pre-emulsified with a Pendralik stirrer and then emulsified to completion by means of an ultra pipe. An aqueous amine solution, consisting of 19.2 g of diethylene triamine, 9.8 g of ethylene diamine and 47.1 g of distilled water, is then added with stirring to the emulsion thus formed. After the amine has been added, the product is stirred in one case for 1 hour at room temperature (Example 7a) and in the other case, for 1 hour at room temperature and then for 2 hours at 60° C. using a laboratory stirrer (Example 7b).

Testing of the microcapsule suspension

Carbonless copying papers were produced with all the microcapsule suspensions and subjected to an ageing test for 0,3,6 and 12 days at 70° C./75% relative humidity.

The procedure was as follows

The microcapsule dispersion produced in accordance with Examples 1 to 7b were coated onto a supporting paper using a wire doctor (30 μm) to form a cover sheet of a carbonless copying paper.

The resistance of the capsules to ageing was determined by the following test

A sample of the paper thus produced was placed with the coated side on a receiving paper and another 7 sheets of paper placed on top. Using a typewriter, an area of approximately 4×4 cm was typed with the letter "w" as many times as possible under a constant striking pressure. The copy then visible on the lowermost receiving paper was examined for its clarity of impression by measuring the loss of reflection against untyped paper with a remission measuring apparatus.

Another 3 samples of the coated paper are tempered for 3,6 and 12 days at 70° C./75% relative humidity in a conditioning cabinet. Each of the papers thus treated was then examined for clarity of impression in the same way as described above.

The result of the tests carried out with reference to Examples 1 to 7b are set out in the following Table.

It can be sseen that only the capsules produced by the process according to the present invention show adequate resistance to ageing.

TABLE

Clarity of impression of the 8th copy (% remission value) after storage at 70° C./75% relative humidity for various days.

| Example No. | 0 day | 3 days | 6 days | 12 days |
| --- | --- | --- | --- | --- |
| 1 | 45.5 | 45.6 | 45.8 | 45.2 |
| 2 | 47.1 | 44.1 | 42.9 | 43.1 |
| 3 | 46.2 | 44.8 | 44.0 | 43.8 |
| 4 | 50.8 | 48.1 | 46.2 | 47.6 |
| 5 | 42.8 | 42.8 | 41.8 | 41.1 |
| 6 | 45.5 | 45.5 | 45.9 | 45.1 |
| 7a | 57.2 | 10.0 | cannot be measured | no copy |
| 7b | 51.0 | 31.4 | 27.1 | 25.2 |

We claim:

1. A microcapsule comprising a capsule wall which surrounds a core, the capsule wall comprising the polyaddition product of a diamine and a diisocyanate of the formula

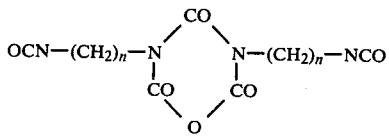

wherein n is an integer of from 3 to 6 and the core comprising a solution of a color-former and an organic solvent comprising a mixture of an alkyl naphthalene and an isoparaffin having from 10 to 20 carbon atoms, said microcapsule having been tempered for at least 2 hours at a temperature of from 60 to 70° C. after its formation.

2. The microcapsule as claimed in claim 1 wherein the diamine is an aliphatic primary or secondary diamine or hydrazine or a hydrazine salt.

3. The microcapsule as claimed in claim 1 wherein the organic solvent is a mixture of from 70 to 90 parts by weight of an alkyl naphthalene and from 10 to 30 parts by weight of an isoparaffin.

4. A process for preparing a microcapsule of claim 1 which comprises dissolving the diisocyanate and color-former in the organic solvent, emulsifying the thusly formed organic phase in an aqueous phase, adding the diamine in the form of an aqueous solution and in a stoichiometric quantity to the thusly formed emulsion and tempering resulting microcapsules for at least 2 hours at a temperature of from 60° to 70° C.

* * * * *